US007499023B2

United States Patent
Onodera (10) Patent No.: US 7,499,023 B2
(45) Date of Patent: Mar. 3, 2009

(54) HAPTIC FEEDBACK INPUT DEVICE

(75) Inventor: Mikio Onodera, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 727 days.

(21) Appl. No.: 11/122,820

(22) Filed: May 5, 2005

(65) Prior Publication Data
US 2005/0264524 A1   Dec. 1, 2005

(30) Foreign Application Priority Data
May 17, 2004   (JP)   ............... 2004-146133

(51) Int. Cl.
*G09G 5/00*   (2006.01)
(52) U.S. Cl. .................. 345/156; 345/157; 345/158; 345/159
(58) Field of Classification Search .......... 345/156–159
See application file for complete search history.

(56) References Cited

U.S. PATENT DOCUMENTS

| | | | |
|---|---|---|---|
| 4,823,634 A | 4/1989 | Culver | |
| 5,912,661 A | 6/1999 | Siddiqui | |
| 6,128,006 A | 10/2000 | Rosenberg et al. | |
| 7,327,348 B2 * | 2/2008 | Goldenberg et al. | ........ 345/156 |

FOREIGN PATENT DOCUMENTS

| | | |
|---|---|---|
| WO | WO 93/07553 | 4/1993 |
| WO | WO 03/012557 | * 2/2003 |

OTHER PUBLICATIONS

Search Report dated Oct. 27, 2006 for corresponding European Patent Application No. 05010305.0.
Examination Report for corresponding European Patent Application Serial No. 05010305.0-1252, dated Aug. 23, 2007.

* cited by examiner

*Primary Examiner*—Richard Hjerpe
*Assistant Examiner*—Leonid Shapiro
(74) *Attorney, Agent, or Firm*—Brinks Hofer Gilson & Lione (57) ABSTRACT

A haptic feedback input device includes an operating member having an annular circumferential surface, capable of rotating in a circumferential direction and moving radially, a motor that applies a torque to the operating member, a detecting unit that detects radial movement of the operating member, and housings that have an opening through which a part of the circumferential surface of the operating member is exposed. The operating member and the motor are connected via meshing gears that reduces a rotational speed of a rotating shaft of the motor to transmit an increased torque to the operating member. A common bracket supports the operating member and the motor.

5 Claims, 4 Drawing Sheets

HAPTIC FEEDBACK INPUT DEVICE

This application claims the benefit of priority to Japanese Patent Application No. 2004-146133 filed on May 17, 2004, herein incorporated by reference.

BACKGROUND OF THE INVENTION

1. Field of the Invention

The present invention relates to an input device used for operating an electrical apparatus, for example, an air conditioner mounted on a vehicle, and particularly to a haptic feedback input device giving a predetermined haptic force feedback to an operator which operates manually a knob in response to the rotational direction and rotational angle of the knob.

2. Description of the Related Art

A conventional haptic feedback input device includes, for example, a haptic feedback input device having a manually rotated and moved knob, an encoder which detects the rotational angle of the knob, a push button switch which detects movement, a motor which applies a torque to the knob, and a controller which controls the motor in response to a rotational angle detected by the encoder and outputs an operating signal in response to the rotational angle to a separate apparatus as an object to be operated by the knob.

In the haptic feedback input device constructed as above, the knob is manually rotated, for example, to output an operating signal that operates an onboard electrical apparatus. Here, the air volume adjustment and outlet switching of an onboard air conditioner, the adjustment of sound volume of a radio or a tuner of the an audio system, or the adjustment of sound volume or sound quality of an audio system are objects to be operated.

In this case, first, after the knob is rotated to select an onboard air conditioner, etc. as an object to be operated, the knob is depressed to fix an apparatus as the object to be operated. Next, in a case in which the air volume of the onboard air conditioner is adjusted, for example, when the knob is rotated in a direction that the air volume increases, a torque is applied to the knob from the motor in a direction opposite to the rotating direction of the knob. At this time, with an increase in the rotational angle of the knob in the direction that the air volume increases, the torque in the direction opposite to the rotating direction of the knob is set to increase. In other words, an operator can grasp that the operating member 12 has been rotated to some extent in a direction that the air volume increases, from the haptic force feedback accompanied with an increase in a resistance force applied from the knob.

In addition, as above-mentioned, besides obtaining the resistance feeling as the haptic force feedback, the haptic feedback input device includes, for example, a haptic feedback input device in which an accelerating feeling can be obtained as the haptic force feedback by applying a torque to the knob in the same direction as the rotating direction of the knob, or a haptic feedback input device in which a click feeling can be obtained by reversing the torque applied to the knob when the rotational angle of the knob exceeds a predetermined rotational angle.

As such conventional haptic feedback input devices, an input device of type in which a motor and a knob are directly connected to each other, and the knob and the motor are simultaneously moved is known. This type of directly connected haptic feedback input device has a disadvantage that a torque as the feedback force is not sufficient because the transmission ratio of the motor to the knob becomes 1 to 1.

Therefore, nowadays, in order to make up for the insufficient torque, an input device has already been developed in which the only knob fixing the motor is movably supported, a pulley and a belt are provided for reducing the rotational speed of a rotating shaft of the motor to transmit an increased torque to the knob, and the motor and the knob are connected to each other via the pulley and belt (for example, see U.S. Pat. No. 6,128,006).

Figure 7:
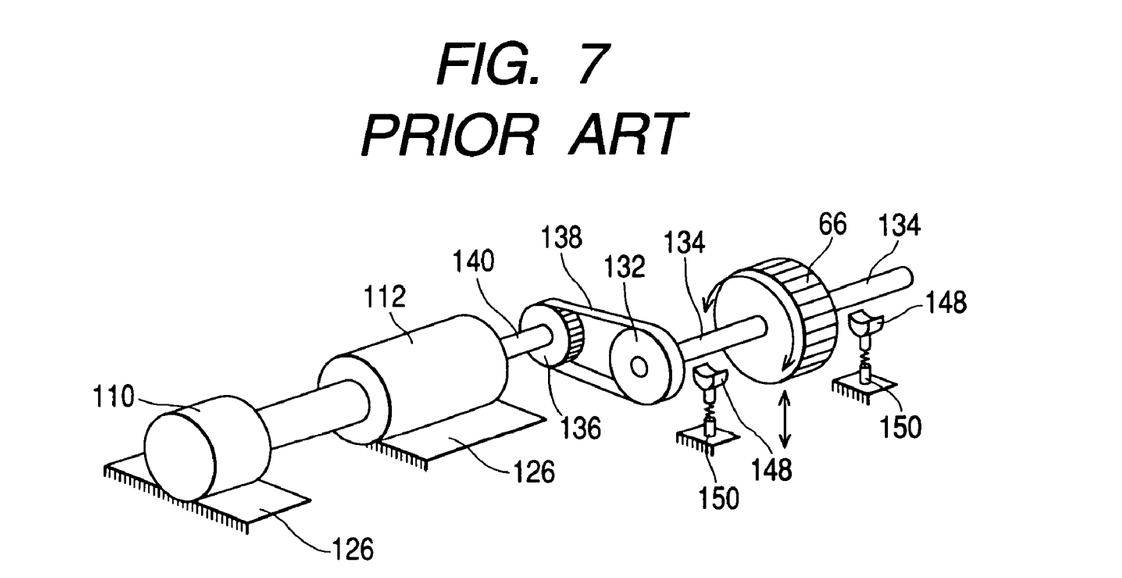
FIG. 7 is a perspective view showing the structure of main parts of a conventional haptic feedback input device.

The conventional input device will now be described with reference to FIG. 7. The input device has a housing 126, an actuator (a motor) 112 supported by the housing 126, a sensor (an encoder) 110, a knob 66 which is rotatably and swingably connected to a rotating shaft 140 of the actuator 112 via a pulley 132 and a belt 138, and a push button switch 150 which detects the movement of the knob 66 during its swing.

Next, the operation of the input device will be described. When the knob 66 is rotatably operated, the rotating shaft 140 of the actuator 112 is rotated via the pulley 132 firmly fixed to a shaft 134 and the belt 138, and thereby the rotational angle of the knob is detected by the sensor 110 connected to the actuator 112. Then, a controller (not shown) controls the actuator 112 in response to the rotational angle detected by the sensor 110, and then outputs an operating signal in response to the rotational angle of the knob 66 to a specific apparatus as an object to be operated by the knob 66.

At that time, the actuator 112 is controlled in response to a signal from the controller. In this case, the actuator 112 and the knob 66 are connected to each other with the belt 138 via the pulleys 136 and the 132, and the diameters of the pulleys 136 and 132 are varied to alter the transmission ratio of the actuator 112 and the knob 66. Therefore, the rotational speed of the rotating shaft 140 of the actuator 112 can be reduced to transmit an increased torque to the knob, thereby transmitting a sufficient torque from the actuator 12 to the knob 66.

Further, by depressing the knob 66 after the knob 66 has been rotated to select an apparatus, as an object to be operated, among various kinds of apparatuses, the knob 66 and the shaft 134 are swung, and thereby the shaft 134 depresses the push button switch 150 via a drive member 148 which is disposed in a lower portion of the shaft. Then, a signal detected by the depression of the push button switch 150 is sent to the controller to determine an apparatus as an object to be operated.

However, in the structure of the above-mentioned conventional haptic feedback input device, when the knob 66 is depressed to move the shaft 134, the relative positional relationship between the rotating shaft 140 of the actuator (motor) 112 and the shaft 134 of the knob 66 is altered. Therefore, there is a problem in that the torque of the actuator (motor) 112 cannot be transmitted to the knob 66 via a flexible power transmission member 66, such as the belt 138, however, a direct haptic force feedback cannot be given as compared to the directly connected haptic feedback input device.

SUMMARY OF THE INVENTION

Therefore, the present invention has been made to solve the above problems. It is an advantage of the present invention to provide a haptic feedback input device having a speed reduction mechanism which reduces the rotational speed of a motor to transmit an increased torque to a knob, and is capable of transmitting a torque of a motor to the knob without via a flexible power transmission member, such as a belt, to give a direct haptic force feedback.

In order to solve the above problems, as a first aspect of the present invention, there is provided an haptic feedback input device including an operating member having an annular circumferential surface, and capable of rotating in a circumferential direction and moving radially; a motor that applies a torque to the operating member; a detecting means that detects the radial movement of the operating member; and a housing that has an opening through which a part of the circumferential surface of the operating member is exposed, and accommodates the operating member and the motor. The operating member and the motor are connected to each other via meshing gears that reduce a rotational speed of a rotating shaft of the motor to transmit an increased torque to the operating member. A common bracket is provided for supporting the operating member and the motor at predetermined positions so that the operating member and the motor can be moved in a radial direction of the operating member, respectively. The operating member and the motor are supported via the common bracket by the housing so as to be movable together.

Further, as a second aspect, the housing and the bracket are provided with a guide means extending along a moving direction of the bracket.

Further, as a third aspect, a supported position of the operating member to the bracket is on the opposite side to a supported position of the motor with respect to the operating member.

Further, as a fourth aspect, a supported position of the bracket to the housing is at the motor side, and a detecting means that detects the movement of the operating member is disposed at the supported position of the operating member to the bracket.

Further, as a fifth means, a supported position of the motor to the bracket is at an inner bottom portion of the housing, and the motor is connected to the operating member via the meshing gears on the opposite side to the circumferential surface of the operating member exposed through the opening the housing.

DESCRIPTION OF THE PREFERRED EMBODIMENT

Figure 1:
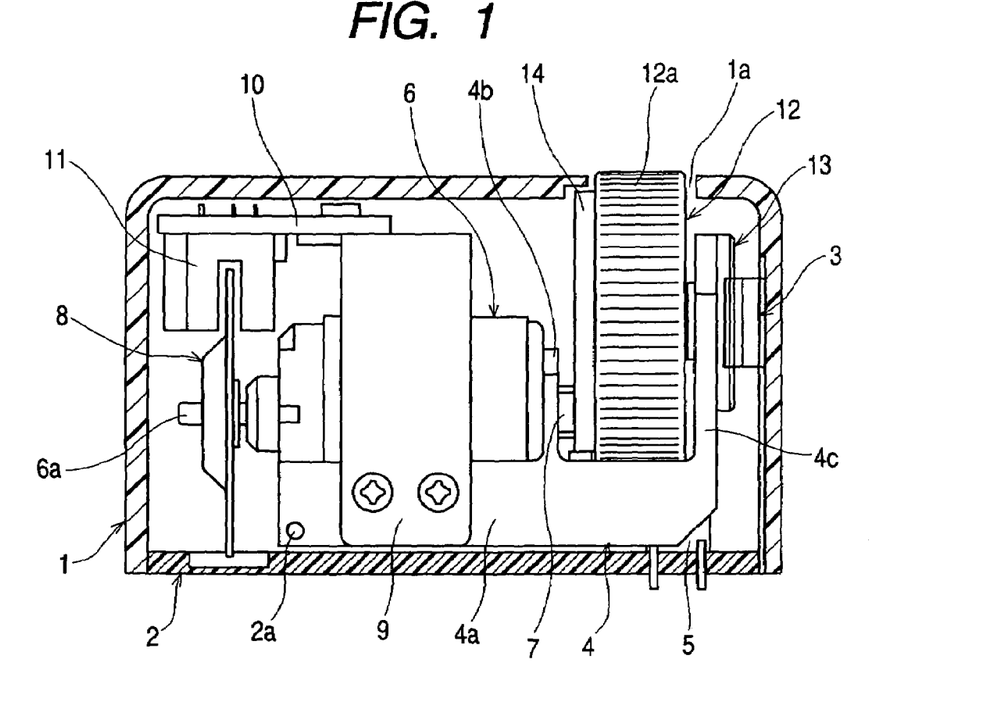
FIG. 1 is a front view showing the structure of a haptic feedback input device according to an aspect of the present invention.
Figure 2:
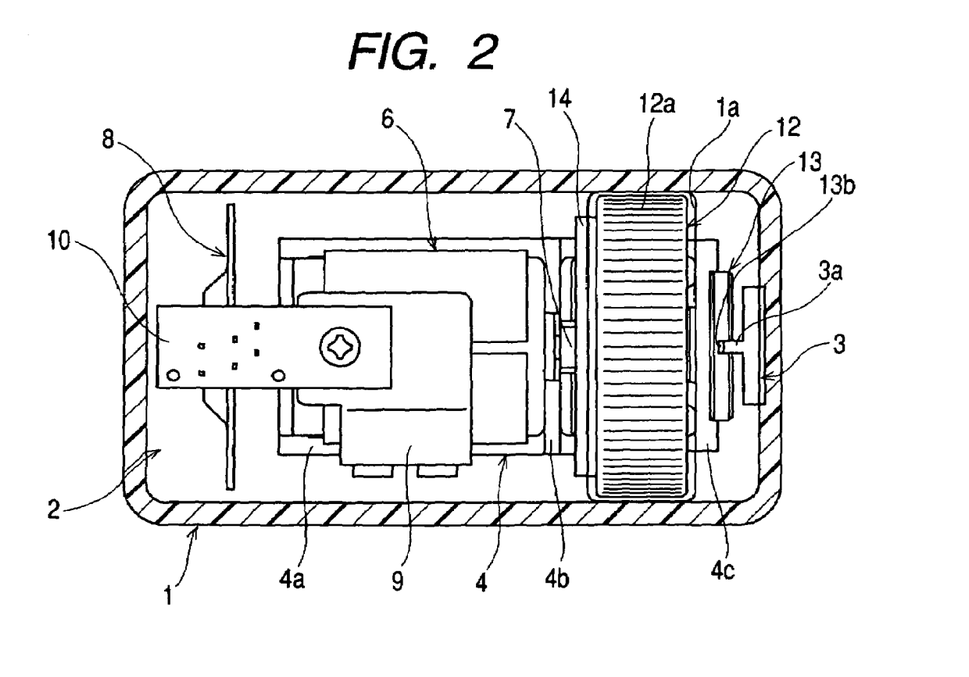
FIG. 2 is a plan view showing the structure of the haptic feedback input device according to the aspect of the present invention.
Figure 3:
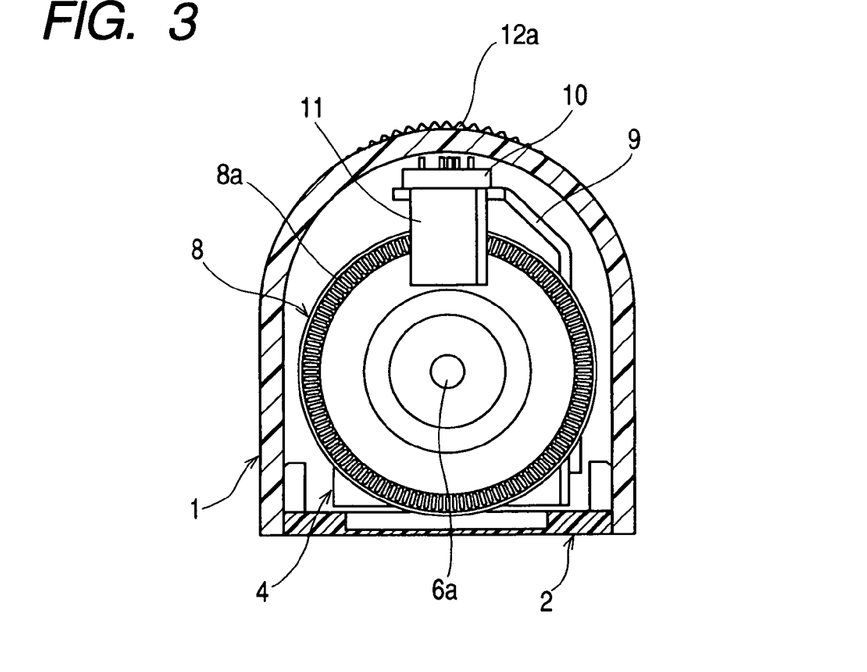
FIG. 3 is a left side view showing the structure of the haptic feedback input device according to the aspect of the present invention.
Figure 4:
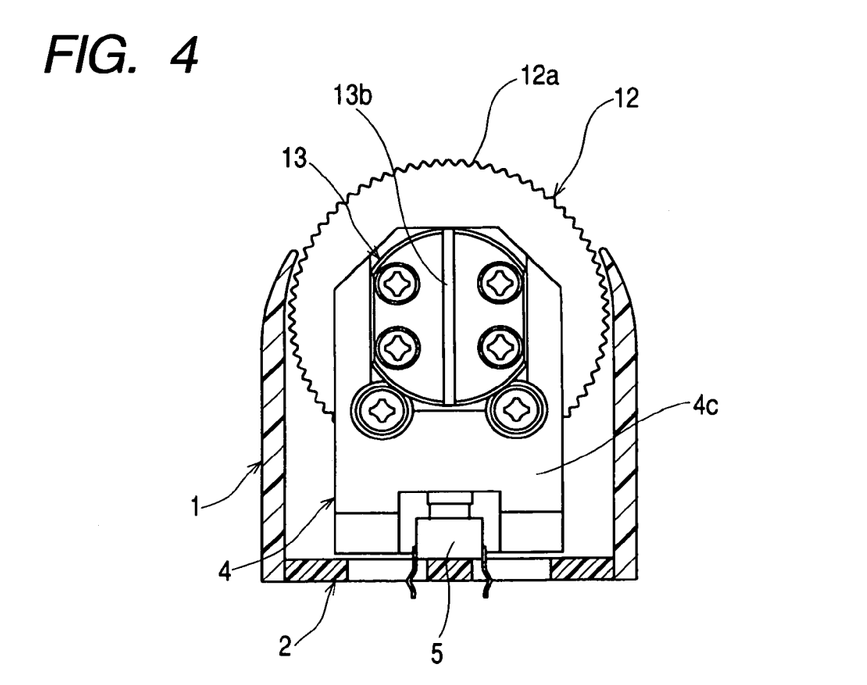
FIG. 4 is a right side view showing the structure of the haptic feedback input device according to the aspect of the present invention.
Figure 5:
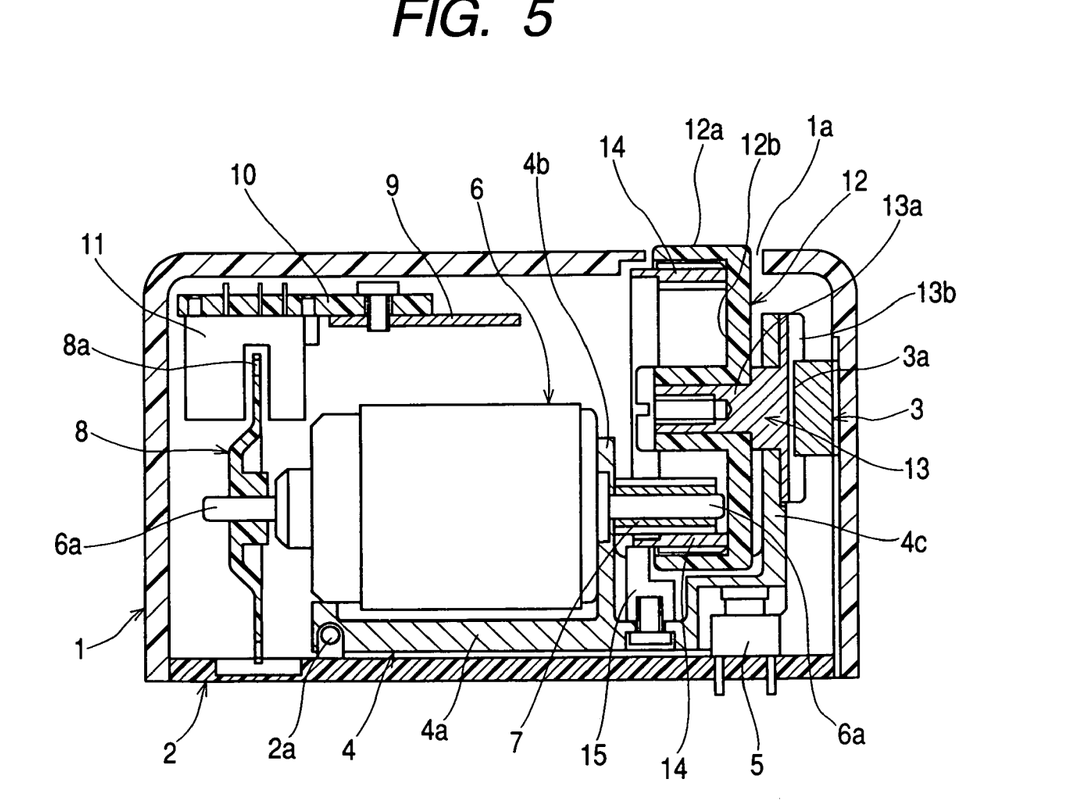
FIG. 5 is a sectional view showing the structure of the haptic feedback input device of the aspect of the present invention.
Figure 6:
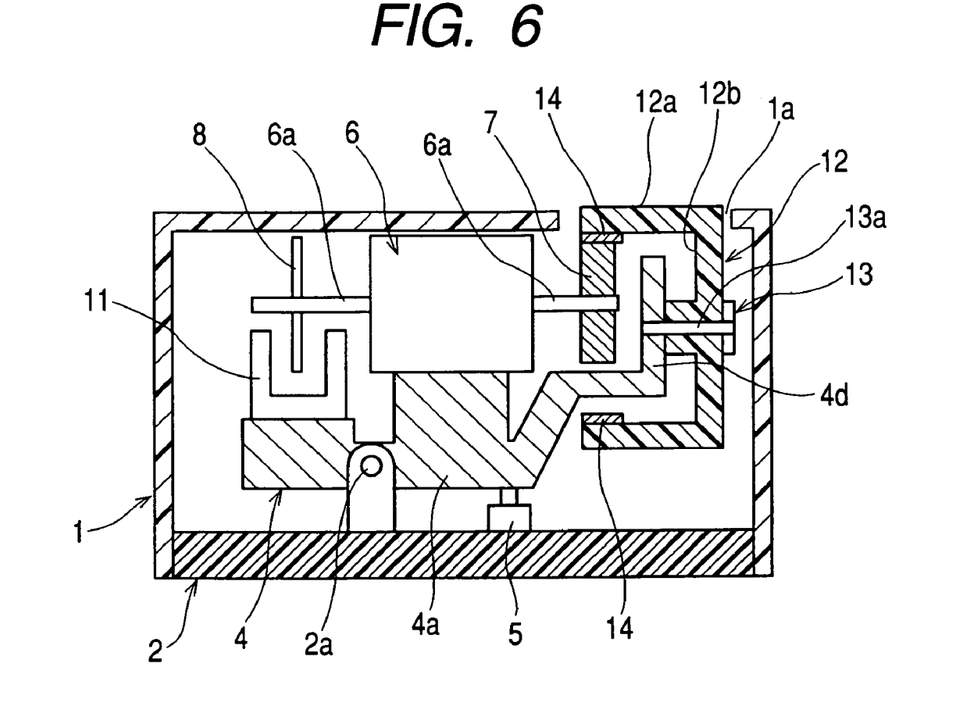
FIG. 6 is a sectional view showing the structure of a haptic feedback input device according to an embodiment of an another aspect of the present invention.

Hereinafter, preferred embodiments of the present invention are shown in FIG. 1 to FIG. 6. FIG. 1 is a front view showing the structure of a haptic feedback input device according to an aspect of the present invention. FIG. 2 is a plan view showing the structure of the haptic feedback input device. FIG. 3 is a left side view showing the structure of the haptic feedback input device. FIG. 4 is a right side view showing the structure of the haptic feedback input device. FIG. 5 is a sectional view showing the structure of the haptic feedback input device. FIG. 6 is a sectional view showing the structure of a haptic feedback input device according to an embodiment of another aspect of the present invention. In addition, FIGS. 1 to 4 show a state in which a part of a housing is removed in order to facilitate understanding of the internal structure.

In those drawings, a housing is made of an insulating material such as a synthetic resin. The housing includes a dome-shaped upper case 1 having a hollow portion therein and a flat plat-shaped bottom plate 2 that is engaged with a lower surface of the upper case 1 to cover the hollow portion. Further, an upper surface of the upper case 1 is provided with a rectangular opening 1a. A part of a circumferential portion of an operating member 12, which will be described later, is exposed through the opening 1a. Further, in the upper case 1, one inner surface on the side of the opening 1a is provided with a guide member 3 which has a protrusion 3a extending along an up-and-down direction.

A bracket 4 is made of a synthetic resin material or a metallic material and has a substantially F-shaped section. The bracket 4 has a slightly thick base 4a, a first attachment plate 4b which stands upright substantially in the middle of the base 4a, and a second attachment plate 4c which stands upright at one end of the base 4a parallel to the first attachment plate 4b. The bracket 4 is journalled to the bottom plate 2 with a supporting shaft 2a at the other end of the base 4a, and the one end thereof is adapted to be rotatable. Further, a push button switch 5 as a detecting means is disposed on a portion of the bottom plate 2 located below the one end of the base 4a, and has its one end depressed with the rotation of the bracket 4.

A motor 6 is attached to the first attachment plate 4b of the bracket 4 for applying a torque to the operating member 12 which will be described later, and one end of a rotating shaft 6a of the motor 6 protrudes toward the second attachment plate 4c. A first meshing gear 7 is firmly fixed to the one end of the rotating shaft 6a of the motor 6. The first meshing gear 7 meshes with a second meshing gear 14 of the operating member 12, which will be described later, to reduce the rotational speed of the rotating shaft 6a. Further, the motor 6 is supported in the vicinity of the base 4a of the bracket 4 and supported at the inner bottom surface of the bottom plate 2.

Further, a code plate 8 is firmly fixed to the other end of the rotating shaft 6a of the motor 6 for detecting a rotational angle of the rotating shaft 6a, i.e., a rotational angle of the operating member 12 and outputting a rotational angle signal corresponding to the rotational angle. The code plate 8 has a number of codes, for instance, slits 8a arrayed along its circumferential direction. Moreover, a circuit board 10 is attached to the base 4a of the bracket 4 via an L-shaped supporting plate 9. A photosensor 11 is attached to the circuit board 10. A light-emitting portion and a light-receiving portion of the photosensor 11 are arranged to face each other with the slits 8a of the code plate 8 therebetween. The code plate 8 and the photosensor 11 constitute an encoder as a rotational angle detecting means.

The operating member 12 is made of an insulating material, such as a synthetic resin, and has an annular circumferential surface 12a, and is formed in a cylindrical shape having a hollow portion 12b with its one side open. The operating member 12 is journalled to a supporting shaft 13a of the rotation supporting member 13 which is provided in the second attachment plate 4c of the bracket 4 so as to protrude toward the first attachment plate 4b, and is rotatably attached between the first attachment plate 4b and the second attachment plate 4c.

In this way, since a supported position of the operating member 12 to the bracket 4 is on the opposite side to a supported position (first attachment plate 4b) of the motor 6 to the bracket 4 with respect to the operating member 12, the operating member 12 can be disposed between its supported position (second attachment plate 4c) to the bracket 4, and the motor 6. Therefore, the operating member 12 can be freely designed without any restriction in shape, and the bracket 4 can also be robustly formed to have a sufficient thickness without any restriction in shape.

Further, the second meshing gear 14 which continuously extends annularly along the inner circumferential surface is firmly fixed to the hollow portion 12b of the operating member 12. Also, the first meshing gear 7 firmly fixed to the one end of the rotating shaft 6a of the motor 6 which is attached to the first attachment plate 4b is disposed within the hollow portion 12b of the operating member 12 to allow the first meshing gear 7 to mesh with the second meshing gear 14. Further, since the supported position of the motor 6 to the bracket 4 is at the inner bottom surface of the bottom plate 2, the first meshing gear 7 meshes with the second meshing gear 14 on the opposite side to the circumferential surface 12a where the operating member 12 is exposed through the opening 1a of the upper case 1.

In this way, since the supported position of the motor 6 to the bracket 4 is at the inner bottom portion of the bottom plate 2 with respect to the supporting shaft 13a of the operating member 12, and the motor 6 is connected to the operating member 12 via the first and second meshing gears 7 and 14 on the opposite side to the circumferential surface 12a of the operating member 12 exposed through the opening 1a of the upper case 1, the first meshing gear 7 of the motor 6 can be made small without the motor 6 popping out of the upper case 1 constituting the housing. Therefore, the rotational speed of the motor 6 can be reduced, and obstacles around the opening 1a of the upper case 1 can be removed.

In that case, since the number of gears (teeth) of the second meshing gear 14 can be formed to be sufficiently larger than the number of gears (teeth) of the first meshing gear 1, the rotational speed of the rotating shaft 6a of the motor 6 is reduced using the first meshing gear 7 and the second meshing gear 14. As a result, during the rotation of the motor 6, a sufficient torque can be given the operating member 12.

Further, the operating member 12 and the motor 6 are attached to the common bracket 4, and when the operating member 12 is depressed and moved downward, the motor 6 move together. Also, the first meshing gear 7 and the second meshing gear 14 that are a speed reduction mechanism for motor 6 rotation transmit a direct torque to the operating member 12 without a change in a meshing state therebetween.

Further, since a supported position of the bracket 4 to the bottom plate 2 is at the motor 6, and the push button switch 5 as a detecting means which detects the movement of the operating member 12 is disposed at the position where the operating member 12 and the bracket 4 are supported, the push button switch 5 can be disposed at a position remote from the swing fulcrum of the bracket 4. Therefore, the stroke that the operating member 12 depresses the push button switch 5 can be set short, and the push button switch 5 can be depressed in the vicinity of the operating member 12, which makes it possible to improve operation feeling.

Further, the rotation supporting member 13 provided in the second attachment plate 4c of the bracket 4 is formed with a guide groove 13b which protrudes in an opposite direction to the protruding direction of the supporting shaft 13a and extends the moving direction of the bracket 4 in the middle thereof. The guide groove 13b engages the protrusion 3a of the guide member 3 provided on one inner surface of the upper case 1 on the side of the opening 1a, thereby constituting a guide means when the bracket 4 moves in an up-and-down direction.

In this way, the guide member 3 having the protrusion 3a extending along the moving direction of the bracket 4, and the guide groove 13b are provided in the upper case 1 constituting a part of the housing as guide means, and these guide means guides the movement of the bracket 4. Therefore, when the operating member 12 is depressed, the lateral run-out when the operating member moves radially can be prevented from occurring.

Further, a gear guide 15 which supports the circumferential portion (lower surface) of the second meshing gear 14 is provided on the base 4a of the bracket 4 at the lower surface of the operating member 12 between the first attachment plate 4b and the second attachment plate 4c. By providing the gear guide 15, the displacement, such as the tilting, of the operating member 12, can be prevented, and when the operating member 12 is depressed, the meshing state between the first meshing gear 7 and the second meshing gear 14 can be kept constant to allow stable transmission of a torque.

Moreover, although not shown, the haptic feedback input device is connected to an external controller. The controller has an input unit, a calculating unit, a storage unit, and an output unit. A rotational angle signal and a rotational direction signal output from the encoder are input to the input unit. The calculating unit calculates a value (voltage value) of a control signal that controls the motor 6 in response to the rotational angle signal and rotational direction signal that are input to the input unit. The output unit outputs the control signal to the motor 6 in response to the calculation result by means of the calculating unit. Also, a control program for operating the controller, a function used for calculation of the value of the control signal by means of the calculating unit, and an arithmetic expression are previously stored in the storage unit.

Next, the operation of the haptic feedback input device having the above structure will be described.

First, when the operating member 12 is rotated, the motor 7 is rotated via the second meshing gear 14 and the first meshing gear 7, and the code plate 8 firmly fixed to the rotating shaft 6a is rotated to input a code signal read by the photosensor 11 to the input unit of the controller (not shown). Then, the previously stored control signal is output from the output unit to perform switching of a display device (not shown). It is noted herein that the operating member 12 is depressed after an apparatus (for instance, an air conditioner) as an object to be operated has been selected, and thereby the bracket 4 is rotated (swung) downwardly about the supporting shaft 2a as a fulcrum to push the push button switch 5 disposed below facing one end of the base. Then, a detected signal is input to the controller to determine an apparatus (air conditioner) as an object to be operated.

Next, various kinds of modes (outlet switching/temperature setting/air volume setting) are selected and determined in the same way as the above. Then, when the operating member 12 is rotated in an operation object (for instance, air volume) detecting mode, a rotational angle is detected by the encoder (code plate 8 and photosensor 11), and then a rotational angle signal corresponding to the rotational angle is input to the input unit of the controller. Then, the calculating unit calculates the value of an operating signal in response to the rotational angle of the operating member 12 from the function previously stored in the storage unit. Then, the operating signal of the value calculated by the calculating unit is output from the output unit. As a result, the air volume of an air conditioner, etc. increases.

At that time, the value of the control signal of the motor 6 in response to the rotational angle of the operating member 12 is calculated in the calculating unit. Then, the control signal of the value calculated by the calculating unit is output to the motor 6 from the output unit. Thereby, a force that resists the rotating operation is applied to the operating member 12 from the motor 6. In this case, with an increase in the rotational angle of the operating member 12, the force that resists the rotating operation increases. In other words, an operator can grasp that the operating member 12 has been rotated to some extent in a direction that the air volume increases, from the haptic force feedback accompanied with an increase in a resistance force applied from the operating member 12.

When the rotational angle of the operating member 12 reaches a predetermined rotational angle (for instance, MAX position), the encoder detects the predetermined rotational angle and then a rotational angle signal corresponding to the predetermined rotational angle is input to the input unit of the controller. Then, the calculating unit determines whether or not the rotation of the operating member 12 is stopped on the basis of the arithmetic expression previously stored in the storage unit. A brake control signal corresponding to the determination is output to the motor 6 from the output unit. As a result, the operating member 12 is stopped from being rotated above a predetermined rotational angle.

As described above, the haptic feedback input device having the above structure, for example, outputs an operating signal that operates onboard electrical apparatuses by manually rotating the operating member 12. Here, the air volume adjustment and outlet switching of an onboard air conditioner, the adjustment of sound volume or a tuner of the an audio system, or the adjustment of sound volume or sound quality of an audio system are objects to be operated.

According to the above-described embodiment of the present invention, the operating member 12 and the motor 6 are connected to each other via the first and second meshing gears 7 and 14 which reduces the rotational speed of the rotating shaft 6*a* of the motor 6 to transmit an increased torque to the operating member 12. Also, the common bracket 4 is provided for supporting the operating member 12 and the motor 6 at predetermined positions so that they can be moved in the radial direction of the operating member 12, and the operating member 12 and the motor 6 are movably supported together on the upper case 1 and the base plate 2 which constitute the housing via the common bracket 4. Thus, even when the operating member 12 is moved in the radial direction, the motor 6 moves together. Therefore, the relative positional relationship between the rotating shaft 6*a* of the motor 6 and the supporting shaft of the operating member 12 is not altered. Accordingly, the torque of the motor 6 can be transmitted without via a flexible power transmission member, such as belt, which makes it possible to give a direct haptic force feedback.

FIG. 6 shows a haptic feedback input device according to an embodiment of another aspect of the present invention.

In addition, the same parts as those in the above-described embodiment shown in FIG. 1 to FIG. 5 are denoted by the same reference numerals and the description thereof will be omitted.

In that case, the present embodiment is partially different from the embodiment shown in FIG. 1 to FIG. 5 in the attachment structure of the motor 6 and operating member 12 supported by the bracket 4.

Specifically, the embodiment shown in FIG. 6 has the same structure as the first embodiment in that the motor 6 and the operating member 12 are supported by the common bracket 4, and are supported to be movable together by the housing. However, the motor 6 is disposed in an upper portion of the housing via the bracket 4, and the operating member 12 is supported (journalled) on the opposite side to the supported position of the motor 6 with respect to an attaching portion 4*d* outside the attaching portion 4*d* of the bracket 4.

In this case, the operating member 12 and the motor 6 are also connected to each other via the first and second meshing gear 7 and 14 which reduces the rotational speed of the rotating shaft 6*a* of the motor 6 to transmit an increased torque to the operating member 12. Also, the relative positional relationship between the rotating shaft 6*a* of the motor 6 and the supporting shaft of the operating member 12 is not altered. Further, the torque of the motor 6 can be transmitted to the operating member 12 without via a flexible power transmission member, such as belt, which makes it possible to give a direct haptic force feedback.

According to the above structure of the embodiment, since the motor 6 is located and disposed in the upper portion of the housing, the photosensor 11 of the code plate 8 and photosensor 11 which constitute the encoder is directly attached to the base 4*a* of the bracket 4 without via the L-shaped supporting plate 9. Therefore, the number of parts can be reduced and the space can be saved.

In addition, although the haptic feedback input device in which a resistance sense of touch can be obtained as the haptic force feedback has been described in the above-described embodiment of the present invention, the present invention is not limited thereto. For example, a haptic feedback input device may be provided in which accelerating feeling or click feeling can be obtained as the haptic force feedback.

Further the encoder detects the transmission of light through the slits, but a code plate having codes which reflects light can be employed as the encoder.

As described above, an haptic feedback input device of the invention includes an operating member having an annular circumferential surface, and capable of rotating in a circumferential direction and moving radially; a motor that applies a torque to the operating member; a detecting means that detects the radial movement of the operating member; and a housing that has an opening through which a part of the circumferential surface of the operating member is exposed, and accommodates the operating member and the motor. The operating member and the motor are connected to each other via meshing gears that reduce a rotational speed of a rotating shaft of the motor to transmit an increased torque to the operating member. A common bracket is provided for supporting the operating member and the motor at predetermined positions so that the operating member and the motor can be moved in a radial direction of the operating member, respectively. The operating member and the motor are supported via the common bracket by the housing so as to be movable together. Thus, even when the operating member is moved in the radial direction, the motor moves together. Therefore, the relative positional relationship between the rotating shaft of the motor and the supporting shaft of the operating member is not altered. As a result, the torque of the motor can be transmitted without via a flexible transmission member, such as belt, which makes it possible to give a direct haptic force feedback.

Further, the housing and the bracket are provided with a guide means extending along a moving direction of the bracket. Thus, the guide means guides the movement of the bracket. Therefore, when the operating member is depressed, the lateral run-out when the operating member moves radially can be prevented from occurring.

Further, a supported position of the operating member to the bracket is on the opposite side to a supported position of the motor with respect to the operating member. Thus, the operating member can be disposed between its supported position to the bracket and the motor. Therefore, the operating member can be freely designed without any restriction in shape, and the bracket can also be robustly formed.

Further, a supported position of the bracket to the housing is at the motor side, and a detecting means that detect the movement of the operating member is disposed at the supported position of the operating member to the bracket. Thus, the detecting switch can be disposed at a position remote from the swing fulcrum of the bracket. Therefore, the stroke that the operating member depresses the detecting means can be set short, and the detecting switch can be depressed in the vicinity of the operating member, which makes it possible to improve operation feeling.

Further, a supported position of the bracket to the housing is at an inner bottom of the housing, and the motor is connected to the operating member via the meshing gears on the opposite side to the circumferential surface of the operating member exposed through the opening the housing. Thus, the meshing gear of the motor can be made small without the motor popping out of the upper case. Therefore, the rotational speed of the motor can be reduced, and the device can be made small.

What is claimed is:

1. A haptic feedback input device comprising:
   an operating member having an annular circumferential surface, and capable of rotating in a circumferential direction and moving radially;
   a motor that applies a torque to the operating member;
   a detecting means that detects radial movement of the operating member; and
   a housing that has an opening through which a part of the circumferential surface of the operating member is exposed, and accommodates the operating member and the motor;
   wherein the operating member and the motor are connected to each other via meshing gears that reduce a rotational speed of a rotating shaft of the motor to transmit an increased torque to the operating member,
   wherein a common bracket is provided for supporting the operating member and the motor at predetermined positions so that the operating member and the motor can be rotatably moved in a radial direction of the operating member, respectively,
   wherein the operating member and the motor are supported via the common bracket by the housing so as to be rotatably movable together, and
   wherein an attachment plate that supports the operating member stands at a base of the common bracket and the position of the attachment plate is on the opposite side to a supported position of the motor with respect to the operating member.

2. The haptic feedback input device according to claim 1, wherein the housing and the bracket are provided with a guide means extending along a moving direction of the bracket.

3. The haptic feedback input device according to claim 1, wherein a supported position of the operating member to the bracket is on the opposite side to a supported position of the motor with respect to the operating member.

4. The haptic feedback input device according to claim 3, wherein a supported position of the bracket to the housing is at the motor side, and a detecting means that detect the movement of the operating member is disposed at the supported position of the operating member to the bracket.

5. The haptic feedback input device according to claim 3, wherein a supported position of the motor to the bracket is at an inner bottom portion of the housing, and the motor is connected to the operating member via the meshing gears on the opposite side to the circumferential surface of the operating member exposed through the opening the housing.

* * * * *

UNITED STATES PATENT AND TRADEMARK OFFICE
CERTIFICATE OF CORRECTION

PATENT NO. : 7,499,023 B2  
APPLICATION NO. : 11/122820  
DATED : March 3, 2009  
INVENTOR(S) : Mikio Onodera Page 1 of 1

It is certified that error appears in the above-identified patent and that said Letters Patent is hereby corrected as shown below:

On the Title Page

Item (57), line 9, under "ABSTRACT", after "gears that" replace "reduces" with --reduce--.

In the Claims

In column 10, lines 22-25, delete claim 3, in its entirety.

In column 10, claim "4" should be renumbered as --3-- and in line 26, after "according to claim" replace "3" with --1--.

In column 10, claim "5" should be renumbered as --4--; in line 32, after "according to claim" replace "3" with --1--; and in line 37, after "through the opening" insert --of--.

Signed and Sealed this

Eighth Day of December, 2009

David J. Kappos  
*Director of the United States Patent and Trademark Office*

UNITED STATES PATENT AND TRADEMARK OFFICE
CERTIFICATE OF CORRECTION

PATENT NO. : 7,499,023 B2  
APPLICATION NO. : 11/122820  
DATED : March 3, 2009  
INVENTOR(S) : Mikio Onodera It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 727 days.

should read (*) Notice: Subject to any disclaimer, the term of this patent is extended or adjusted under 35 U.S.C. 154(b) by 972 days.

Signed and Sealed this

Thirtieth Day of March, 2010

David J. Kappos
*Director of the United States Patent and Trademark Office*